United States Patent
Coscia et al.

(10) Patent No.: US 11,813,603 B2
(45) Date of Patent: Nov. 14, 2023

(54) REFORMER FURNACE

(71) Applicant: L'Air Liquide Société Anonyme pour l'Etude et l'Exploitation des Procédés George Claude, Paris (FR)

(72) Inventors: Antonio Coscia, Hadamar (DE); Ingo Gammel, Kummersbruck (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/786,357

(22) PCT Filed: Nov. 30, 2020

(86) PCT No.: PCT/EP2020/025549
§ 371 (c)(1),
(2) Date: Jun. 16, 2022

(87) PCT Pub. No.: WO2021/121651
PCT Pub. Date: Jun. 24, 2021

(65) Prior Publication Data
US 2023/0023054 A1 Jan. 26, 2023

(30) Foreign Application Priority Data
Dec. 19, 2019 (EP) .................................... 19020710

(51) Int. Cl.
*B01J 8/06* (2006.01)
(52) U.S. Cl.
CPC ............... *B01J 8/062* (2013.01); *B01J 8/065* (2013.01); *B01J 8/067* (2013.01); *B01J 2208/00504* (2013.01)
(58) Field of Classification Search
CPC ... B01J 8/062; B01J 8/065; B01J 8/067; B01J 19/2425; B01J 2219/00157
See application file for complete search history.

(56) References Cited

U.S. PATENT DOCUMENTS

| 3,120,431 | A | 2/1964 | Carton et al. |
| 2014/0314631 | A1 | 10/2014 | Meissner et al. |
| 2019/0321800 | A1 | 10/2019 | Brown et al. |

FOREIGN PATENT DOCUMENTS

| CN | 109747571 | 5/2019 |
| DE | 10 2011 120938 | 6/2013 |

(Continued)

OTHER PUBLICATIONS

International Search Report and Written Opinion for corresponding PCT/EP2020/025549, dated Feb. 8, 2021.

*Primary Examiner* — Lessanework Seifu
(74) *Attorney, Agent, or Firm* — Elwood L. Haynes

(57) ABSTRACT

The invention relates to a reformer furnace for catalytic reforming of a carbon-containing input material with steam. The reformer furnace has a steel construction which serves as a framework for a refractory lining and for the fastening of burners, reformer tubes and supply and discharge lines. The burners and reformer tubes are arranged in rows, parallel to one another and in alternating fashion. The steel construction includes a plurality of main carrier units, wherein each main carrier unit has at least two vertically extending supports and a horizontally extending main carrier which connects the supports. This type of steel construction makes it possible to achieve uniform spacing of the reformer tubes and burners over the entire reformer furnace. This results in advantages in terms of the maximum operating temperature of the reformer tubes, thereby extending their service life.

14 Claims, 3 Drawing Sheets

(56) References Cited

FOREIGN PATENT DOCUMENTS

| EP | 2 708 812 | 3/2014 |
| EP | 3 182 003 | 6/2017 |
| EP | 3 279 561 | 2/2018 |

REFORMER FURNACE

CROSS REFERENCE TO RELATED APPLICATIONS

This application is a 371 of International Application No. PCT/EP2020/025549, filed Nov. 30, 2020, which claims priority to European Patent Application No. 19020710.0, filed Dec. 19, 2019, the entire contents of which are incorporated herein by reference.

TECHNICAL FIELD OF THE INVENTION

The invention relates to a reformer furnace for catalytic reforming of a carbon-containing input material with steam, wherein the reformer furnace comprises a radiation space defined by a plurality of walls and delimited from the external surroundings, and the radiation space has a steel construction configured as a framework and intended for the fastening of supply and discharge pipelines, burners and vertically arranged reformer tubes.

BACKGROUND

Reformer furnaces for catalytic reforming of carbon-containing input materials with steam are known in a multiplicity of embodiments. A well-known example of a reformer furnace for catalytic reforming of carbon-containing input materials is the steam reformer for reforming natural gas and steam to produce synthesis gas, a mixture of carbon monoxide and hydrogen and often also undesired concomitants such as, for example, carbon dioxide. Such reforming processes proceed endothermically and slowly, and conversion of the carbon-containing input material with steam therefore requires an external firing source for heating the catalyst-filled reformer tubes (also reaction tubes) of the reformer furnace.

In the case of large industrial scale plants, a design employing a substantially box-shaped furnace with vertically arranged reformer tubes has become established. The interior of the sum of the reformer tubes forms the reaction space of the reformer furnace. The reformer tubes are arranged in one or more rows situated alongside one another.

Each reformer tube row is typically fired by two burner rows, wherein one reformer tube row is arranged centrally between two burner rows extending parallel to the reformer tube rows, to ensure uniform firing of the reformer tubes. Wall-adjacent burner rows are distinguished from non-wall-adjacent burner rows. For the well-adjacent burner rows, the burners are arranged between a wall of the reformer furnace and a reformer tube row. For a non-wall-adjacent burner row, the burners are arranged between two reformer tube rows.

The burners are arranged within the so-called firing space of the reformer furnace. The reactant gas supplying to, and the product gas discharging from, the reformer tubes is necessarily effected outside the firing space, and the walls of the reformer tubes therefore define the spatial separation between the reaction space and the firing space.

The whole made up of the firing space and of the reformer tubes is also referred to as the radiation zone of the reformer furnace.

The burners of the burner rows are supplied with air and combustion gas via supply lines and in the most common designs are arranged either in the ceiling or in the floor of the reformer furnace, wherein the flames of the burners are correspondingly directed vertically downwards towards the reformer furnace floor or directed vertically upwards towards the reformer furnace ceiling. Other arrangements of the burners, for example at the lateral walls of the reformer furnace for lateral firing, or a terraced arrangement for diagonal firing, are likewise known but are less frequently employed.

The radiation space of a reformer furnace having one or more reformer tube rows and a plurality of burner rows is generally configured as a steel construction which serves as a framework for a refractory fining of the firing space. Moreover, supply and discharge pipeline systems, the burners and the reformer tubes are fastened to and held by this steel construction.

The ceiling of the radiation space is configured in principle as a self-supporting or suspended steel construction, since vertically arranged supports (for example pillars) for dissipating loads cannot be routed through the firing space. The main carrier units of the steel construction, which consist of vertical supports and horizontal main carriers, are therefore arranged in such a way that the supports extend wall-adjacently and outside of the firing space.

The lateral length of the reformer furnace is defined by the length of the reformer tube rows and the burner rows, that is to say by the number of the reformer tubes and burners for each reformer tube row or burner row. Should the lateral length of the reformer furnace exceed a certain size (for example 6 to 7 metres), static limitations require that there be more than two main carrier units arranged on the end sides of the reformer furnace in order to dissipate the loads caused by the longer burner rows and reformer tube rows. In this case, a third main carrier unit or, where appropriate, further main carrier units must be correspondingly arranged between the main carrier units arranged on the end sides. The spacing of main carrier unit to main carrier unit is in each case substantially identical, and the burner rows and reformer tube rows extend orthogonally to the main carriers of a main carrier unit which extend horizontally on the ceiling of the radiation space.

This design of the steel construction has become established for reformer furnaces known from the prior art, since this is the most economical way of configuring the steel construction.

However, the aforementioned way and manner of arranging the main carrier units also entails disadvantages. As a result of the additional main carrier units not arranged on the end sides of the reformer furnace, that is to say as a result of extending the number of the main carrier units in large reformer furnaces to three or more, the main carriers of the main carrier units that extend horizontally on the ceiling do not extend wall-side but centrally through the radiation space of the reformer furnace. A centrally extending main carrier requires a larger reformer tube axial spacing at this point. In other words, the spacing of one reformer tube from the adjacent reformer tube of a reformer tube row has to be increased at that point at which the main carrier of the main carrier unit extends along the ceiling of the radiation space.

For example, the ideal reformer tube axial spacing in a standard reformer furnace is approximately 300 mm from reformer tube to reformer tube. In the region of a centrally extending main carrier, this reformer tube axial spacing has to be increased to more than 500 mm.

This structural limitation results in the fact that the reformer tubes in the region of the main carrier axes have higher operating temperatures, which generally leads to a reduced service life of the reformer tube and results in higher safety margins in the design of the reformer furnace. The higher temperature at these reformer tubes is caused by the fact that the view factor with respect to the burner flames is higher than in the other reformer tubes which are situated within a reformer tube row and in which the reformer tube axial spacings are smaller.

In this case, there is frequently also mention of the formation of so-called bays within the reformer furnace. The reformer tube axial spacings are correspondingly all identical (small) within one bay and larger between adjacent reformer tubes of two adjacent bays.

SUMMARY

The object of the present invention is to at least partially overcome the afore-mentioned disadvantages of the prior art.

In particular, an object of the present invention is to provide a reformer furnace in which the spacings between two adjacent reformer tubes within a reformer tube row are identical over the entire reformer furnace.

A further object of the present invention is to provide a reformer furnace which comprises no bays.

A further object of the present invention is to provide a reformer furnace in which the reformer tubes have more uniform operating temperatures than is the case in known reformer furnaces.

The independent claims provide a contribution to the at least partial achievement of at least one of the aforementioned objects. The dependent claims provide preferred embodiments which contribute to the at least partial achievement of at least one of the objects. Preferred embodiments of constituents of a category according to the invention are, where relevant, likewise preferred for identically named or corresponding constituents of a respective other category according to the invention.

The terms "having", "comprising" or "containing", etc. do not preclude the possible presence of further elements, ingredients, etc. The indefinite article "a" does not preclude the possible presence of a plurality.

The objects of the present invention are at least partially achieved by a reformer furnace for catalytic reforming of a carbon-containing input material with steam, having a radiation space defined by a plurality of walls and delimited from the external surroundings, wherein the radiation space has a steel construction configured as a framework and intended for the fastening of supply and discharge pipelines, burners and vertically arranged reformer tubes, wherein the burners are arranged for producing downwardly or upwardly directed flames for heating the reformer tubes, and wherein the burners and reformer tubes are arranged within the radiation space in rows as burner rows and reformer tube rows, wherein the burner rows and reformer tube rows are arranged in alternating fashion and parallel to one another, and the steel construction has a plurality of main carrier units, wherein each main carrier unit has two wall-adjacently arranged, vertically extending supports and a horizontally extending main carrier which is connected via the supports and which extends over the entire length of the radiation space, and wherein the main carriers are configured for fastening the supply and discharge pipelines, burners and reformer tubes, and the steel construction has a plurality of horizontally extending crossmembers which connect the supports of the main carrier units to one another. According to the invention, there is provision for the main carriers of the main carrier units to be arranged so as to extend parallel to the reformer tube rows and burner rows, and the crossmembers to be arranged so as to extend at least partially orthogonally to the reformer tube rows and burner rows.

According to the invention, the horizontally extending main carriers of the main carrier units, said carriers extending in particular on the ceiling of the radiation space, are arranged so as to extend parallel to the reformer tube rows and burner rows. This allows the reformer tubes to be arranged continuously over the entire length of the radiation space with the same spacing, since no widening of the reformer tube axial spacings is required as a result of main carriers extending orthogonally to the reformer tube rows.

The main carriers of the main carrier units bear the main load of the supply and discharge pipelines, burners and reformer tubes which are fastened to the main carriers of the steel construction. The vertically arranged supports of the main carrier units are preferably connected to the ends of the main carriers.

The crossmembers, which connect the vertically extending supports of the main carrier units to one another, are arranged at least partially orthogonally, but also parallel to, the reformer tube rows and burner rows. The crossmembers serve for stabilizing the steel construction and do not serve to bear the main load of the supply and discharge pipelines, burners and reformer tubes. In one example, the crossmembers are arranged on the floor of the radiation space. Since the crossmembers have a substantially smaller thickness than the main carriers of the main carrier units, they can also be arranged in the space between the axis of the burners and the axis of the reformer tubes without an increase in the spacing between the individual reformer tubes being required. The crossmembers can in principle be fastened at any desired point between the lower and upper end of a vertically extending support of a main carrier unit, or be fastened to one of the ends.

In reformer furnaces known from the prior art, the crossmembers extend exclusively parallel to the reformer tube rows and burners. Since the crossmembers do not serve to bear the main load of the supply and discharge pipelines, burners and reformer tubes, there result corresponding static limitations, and an orthogonal arrangement of the horizontally extending main carriers is accordingly required. This leads to the aforementioned disadvantages.

The horizontal main carriers of the main carrier units that are connected at least via the vertically arranged supports preferably extend along the ceiling of the radiation space. Here, the main carriers extend along the entire length of the radiation space. What is meant here by "entire length" is that the length of the main carriers is designed to correspond with the radiation space size requirement such that as uniform as possible a heating of the reformer tubes is made possible. The length of the radiation space is defined here by the spacing between the two end sides of the radiation space, that is to say the spacing between the front and rear side.

Arranging the main carriers parallel to the burner rows and reformer tube rows results in the following advantages:

The service life of the reformer tubes as a whole is increased since no load peaks occur at certain reformer tubes.

The maximum temperature ($T_{max}$) measured on a reformer tube, with respect to the sum of the reformer tubes, is lower. This allows the wall thickness of the reformer tubes to be reduced, leading to material savings and hence cost savings.

A smaller wall thickness leads in turn to lower thermally induced operating stresses in the reformer tubes, which in turn extends the service life of the reformer tubes.

A smaller wall thickness additionally leads to improved heat convection from the radiation space into the reformer tube interior. The temperature in the catalyst bed (cracking gas temperature) is increased as a result, which leads to the possibility of more efficient plants being configured (increase in the reformer efficiency).

Depending on the size of the plant, the expected reduction of $T_{max}$ here lies in a range from approximately 5 to 10 Kelvin. It is known from experience and many years of investigations that 10 Kelvin lower (with respect to $T_{max}$) corresponds here to a possible reduction in the wall thickness of 10 percent. If it is intended for the wall thickness to be maintained, there can in return be envisaged a gain in theoretical service life of 20,000 to 40,000 hours for a reformer tube.

The reformer tube rows and burner rows are arranged in alternating fashion and parallel to one another. Since each reformer tube row should be fired from two sides by two burner rows, there is preferably to start with a wall-adjacent burner row arranged along the lateral length of the radiation space. This is followed in alternating fashion, and in dependence on the size of the reformer furnace, by a certain number of non-wall-adjacent reformer tube rows and burner rows, wherein the last of the burner rows, on the opposite side to the "first" wall-adjacent burner row, is in turn a wall-adjacent burner row. There thus preferably results the following arrangement:

lateral wall-wall-adjacent burner row-(reformer tube row-burner row)$_n$-reformer tube row-wall-adjacent burner row-lateral wall. Here, n=0 or a natural number with n≥1.

The burners at the ends of a burner row and the reformer tubes at the ends of a reformer tube row are arranged at the end sides (front and rear side) of the radiation space.

A preferred embodiment of the reformer furnace according to the invention is characterized in that the number of the main carrier units is a function of the number of the reformer tube rows and/or a function of the number of the burner rows. The number of the main carrier units preferably increases with the number of the reformer tube rows and burner rows, since the structurally simplest solution is to be realized if an increasing number of burner rows and reformer tube rows is accompanied by a correspondingly larger number of main carriers for fastening the burners and reformer tubes.

A preferred embodiment of the reformer furnace according to the invention is characterized in that the radiation space has a number h of main carrier units, and has a number r of reformer tube rows, wherein the relationship between h and r is h=r+1. The number of the main carrier units preferably results from the number of the reformer tube rows present, with preferably the radiation space containing one main carrier unit more than there are reformer tube rows arranged in the radiation space.

A preferred embodiment of the reformer furnace according to the invention is characterized in that the radiation space has a number h of main carrier units, and has a number b of burner rows, wherein the relationship between h and b is h=b. The number of the main carrier units preferably results from the number of the burner rows present, with preferably the radiation space containing the same number of main carrier units as there are burner rows arranged in the radiation space.

With further preference, the following holds for the reformer furnace: h=r+1 and h=b.

A preferred embodiment of the reformer furnace according to the invention is characterized in that the number of the main carrier units is not a function of the length of a reformer tube row and/or the number of the main carrier units is not a function of the length of a burner row. By virtue of the fact that the main carriers of the main carrier units are arranged in parallel and along the reformer tube rows and burner rows, the number of the main carrier units is not, as known from the prior art with an orthogonal arrangement, set by the length of the burner rows and reformer tube rows. Rather, the burner rows and reformer tube rows within the radiation space can in principle be designed to have any desired length, with the number of the main carrier units being determined solely by the number of the burner rows and reformer tube rows.

A preferred embodiment of the reformer furnace according to the invention is characterized in that between two adjacent main carrier units an individual burner row is arranged, or
one burner row and one reformer tube row adjacent to the burner row are arranged. Between two adjacent main carrier units there are preferably situated, since this is structurally simple and therefore preferred, either one burner row or one burner row and one reformer tube row adjacent to the burner row.

Here, the one individual burner row, since this can be realized in a structurally simple manner, is preferably a wall-adjacent burner row.

A preferred embodiment of the reformer furnace according to the invention is characterized in that two of the plurality of main carrier units are arranged on two opposite walls of the radiation space, in each case wall-adjacently, wherein the main carriers of the wall-adjacently positioned main carrier units extend parallel to the respective wall. A plurality of main carrier units comprises at least two main carrier units in the case of the smallest possible configuration of the reformer furnace, for example when using only one single reformer tube row and two burner rows whose burners heat the reformer tubes of the single reformer tube row from two sides. In this case, the two main carrier units are each arranged wall-adjacently, with the main carriers extending along the lateral walls from one end side to the opposite end side of the radiation space. In larger reformer furnaces which comprise more than only one single reformer tube row, further main carrier units are typically required. These additional main carrier units are arranged between the wall-adjacently arranged main carrier units, with their main carriers extending horizontally and spaced apart from the lateral walls, and along the ceiling of the radiation space.

A preferred embodiment of the reformer furnace according to the invention is characterized in that the wall-adjacently arranged main carrier units have more than two wall-adjacently arranged, vertically extending supports. The wall-adjacently arranged main carrier units can have more than two vertically extending supports, for example a third support, which are arranged centrally between the two end supports of the main carrier units. This makes it possible for the load-bearing force of the wall-adjacently arranged main carrier units to be increased/improved. Since there are no reformer tube rows or burner rows extending directly along the wall of the radiation space, an additional vertical support arranged at this point does not interfere.

A preferred embodiment of the reformer furnace according to the invention is characterized in that all the spacings between two adjacent reformer tubes within a reformer tube row and/or all the spacings between two adjacent burners within a burner row are identical within the entire radiation space of the reformer furnace. This regularity and symmetry in the arrangement of the burners and reformer tubes is made possible for the first time by the arrangement according to the invention of the main carrier units and is preferred since it leads to evening out of the heating of the reformer tubes. Temperature peaks in the walls of the reformer tubes and in the interior (catalyst bed) of the reformer tubes are thus optimally avoided. This also leads to maximum evening out of the flame patterns of the burners by virtue, for example, of the undesired curving of the flames in the direction of the reformer furnace centre being avoided as far as possible.

A preferred embodiment of the reformer furnace according to the invention is characterized in that all the spacings between two adjacent reformer tubes, measured through the horizontal extending between two reformer tube axes of adjacent reformer tubes, are less than or equal to 500 mm, preferably lying in a range from 250 to 450 mm, more preferably lying in a range from 280 to 320 mm.

A preferred embodiment of the reformer furnace according to the invention is characterized in that the temperature of the product gas withdrawn via the discharge pipelines is on average up to 950° C., preferably lying in a range from 900 to 950° C., more preferably lying in a range from 925 to 950° C.

A preferred embodiment of the reformer furnace according to the invention is characterized in that the steel construction serves as a framework for a refractory lining of the radiation space, wherein the space within the refractory lining defines a firing space for firing the reformer tubes. The steel construction is arranged within the so-called radiation space. The walls or outer walls of the radiation space delimit the latter from the surrounding environment. The steel construction in turn constitutes the framework for a refractory lining of the reformer furnace, wherein this lining is arranged, as viewed from the outer walls, in the direction of the interior of the radiation space.

A preferred embodiment of the reformer furnace according to the invention is characterized in that each main carrier unit has a truss construction arranged above the main carrier unit and connected to the main carrier in a force-fitting manner. The truss construction is preferably connected to the main carriers by means of bolted connections (in a force-fitting manner). Such a truss construction additionally makes it possible for loads to be dissipated via the main carriers of the main carrier units.

The objects are also at least partially achieved by the use of a reformer furnace according to the invention according to at least one of the aforementioned embodiments for steam reforming of a carbon-containing input material, in particular natural gas. The carbon-containing input material can be any carbon-containing input material known to a person skilled in the art that is amenable for reforming with steam to produce synthesis gas.

BRIEF DESCRIPTION OF THE DRAWINGS

The invention is explained in more detail below by an exemplary embodiment. In the following detailed description of the exemplary embodiment, reference is made to the accompanying drawings which form a part thereof and which contain illustrative representations of specific embodiments of the invention. In this connection, direction-specific terminology such as "top", "bottom", "front", "back", etc. is used with reference to the orientation of the described figure(s). Since components of embodiments may be positioned in a multiplicity of orientations, the direction-specific terminology is used for elucidation and is in no way limiting. A person skilled in the art will appreciate that other embodiments may be used and structural or logical changes may be undertaken without departing from the scope of protection of the invention. The following detailed description is therefore not to be understood in a limiting sense, and the scope of protection of the embodiments is defined by the accompanying claims. Unless otherwise stated, the drawings are not true to scale.

Further features, advantages and possible applications of the invention will be apparent from the following description of the exemplary embodiments in connection with the drawings.

DETAILED DESCRIPTION OF PREFERRED EMBODIMENTS

Figure 1:
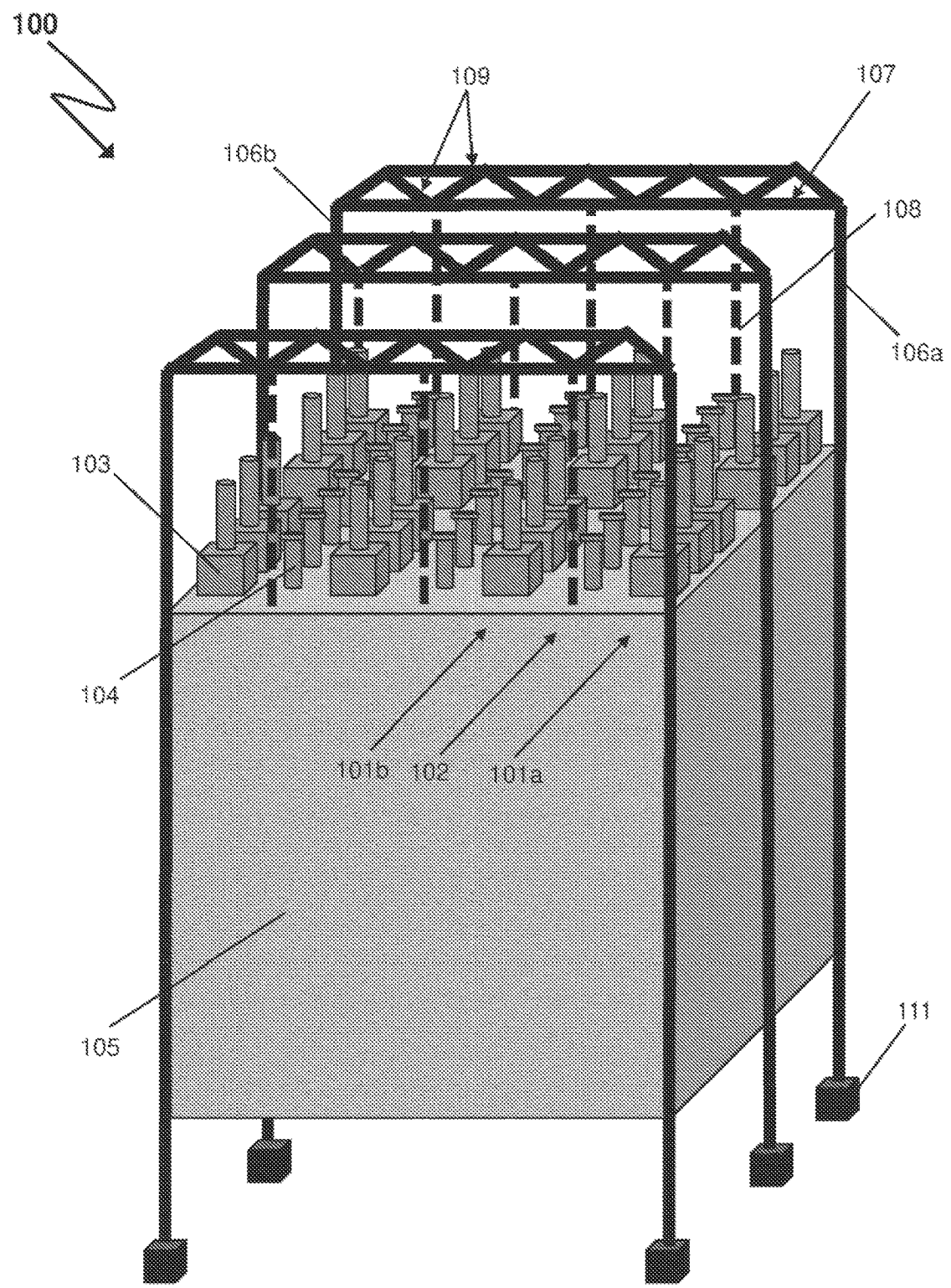
FIG. 1 shows a schematic and highly simplified illustration of a reformer furnace 100 having a steel construction according to the prior art.

FIG. 1 shows a schematic and simplified perspective illustration of a reformer furnace 100 having a steel construction according to the prior art. Shown substantially is the radiation space of the reformer furnace 100 which has the actual steel construction, a refractory lining and a plurality of reformer tube rows and burner rows. The steel construction serves for the fastening of the burners, reformer tubes and supply and discharge lines leading to/from the burners/reformer tubes. Details regarding the fastening means are not shown for reasons of clarity.

The reformer furnace 100 shown has four burner rows 101a, 101b and three reformer tube rows 102. Each of the burner rows 101a, 101b has six burners 103 arranged in a row. Each of the reformer tube rows 102 has eight reformer tubes 104 arranged in a row. The burner rows arranged at the respective left and right edge of the figure are the wall-adjacent burner rows 101a which fire only one reformer tube row 102 arranged adjacently and in parallel. The burner rows arranged between the wall-adjacent burner rows 101a are the non-wall-adjacent burner rows 101b which in each case fire two reformer tube rows 102 arranged adjacently and in parallel. The reformer tube rows 102 and the burner rows 101a, 101b each extend in the z direction of the illustration. The burners 103 each produce downwardly directed flames, that is to say the flame extends substantially in the y direction of the drawing and thereby heats the vertically arranged reformer tubes 104 likewise extending in the y direction. The burners 103 project into the firing space of the radiation space of the reformer furnace, which is defined by the refractory lining 105 as a boundary towards the outside. Here, the vertically extending reformer tubes 103 traverse the ceiling and the floor of the refractory lining 105 in such a way that the main length of a reformer tube 104 can be heated by means of the adjacently arranged burners. The supply lines for supplying the burners with combustion gas and oxidizer and the reformer tubes with reactant gas are not shown for reasons of clarity. The same applies to the flue gas channels and discharge lines for drawing off the burner exhaust gases, and the discharge lines for discharging the product gases.

The steel construction of the reformer furnace shown has a total of three main carrier units. Each of the main carrier units has two vertical supports 106a and 106b and also a horizontal main carrier 107. The supports 106a, 106b each have a base 111. The horizontally extending main carriers 107 connect the two vertically extending supports by means of a force-fitting or integrally bonded connection, for example by means of a bolted connection or a welded connection. Of the total of three main carrier units, two are arranged on the end sides (front and rear side, in each case defined by the xy plane) of the reformer furnace, and one of the main carrier units is arranged between said main carrier units arranged on the end sides. Here, the vertical supports 106a, 106b of the main carrier units are arranged wall-adjacently in each case, with the main carrier unit arranged between the main carrier units arranged on the end sides comprising supports 106a, 106b which extend along the lateral surface (defined by the yz plane) of the reformer furnace. The supports 106a, 106b of the main carrier units arranged on the end sides extend in the region of the boundary between the walls of the end sides (xy plane) and walls of the lateral surfaces (yz plane) of the reformer furnace 100. The walls of the reformer furnace enclose the radiation space along with the steel construction, the refractory lining 105 and also the burners 103 and reformer tubes 104. The walls are not shown for reasons of clarity.

Between the supports 106a, 106b of the main carrier units there are arranged additional vertically extending auxiliary supports 108 which are connected to the main carriers. The auxiliary supports 108 serve for the additional stabilization of the steel construction. The auxiliary supports 108 traverse the ceiling of the refractory lining 105 and are thus arranged partially within the firing space of the reformer furnace 100. In the example of the reformer furnace 100, three auxiliary supports 108 are provided for each main carrier unit. Here, the number of the auxiliary supports 108 depends in principle on the width of the reformer furnace, that is to say on the number of the reformer tube rows and burner rows. Above the main carriers 107 the steel construction has, for additional static stabilization, a truss construction 109 which is connected to the main carrier 107 in a force-fitting manner and which has diagonally and vertically arranged interconnected struts.

The horizontally extending main carriers 107 of the main carrier units are arranged orthogonally to the burner rows 101a, 101b and the reformer tube rows 102. In other words, the main carriers 107 extend in the x direction of the illustration, whereas the burner rows 101a, 101b and reformer tube rows 102 extend in the z direction of the illustration. As a result of the length of the reformer tube rows 102 (with in each case eight reformer tubes 104) and burner rows 101a, 101b (with in each case six burners 103), two main carriers arranged on the end sides are not sufficient on account of static requirements. That is to say that the third main carrier unit arranged between the main carrier units arranged on the end sides is required to satisfy the static requirements of the shown reformer tube row length and burner row length. In principle, the number of the main carrier units of a conventional reformer furnace increases with the length of a reformer tube row 102 and the length of a burner row 101a, 101b.

The third main carrier unit takes up a certain amount of space, for example as a result of the vertically extending auxiliary supports, whereby the spacing between the third and fourth burner of a burner row 101a, 101b must be increased by comparison with all the other burner spacings. The same applies to the spacing between the fourth and fifth reformer tube of a reformer tube row 102. This structural limitation results in the fact that the reformer tubes 104 in the region of the central main carrier unit have higher operating temperatures, which leads to a reduced service life and/or a higher safety margin in the design of the reformer tubes. The higher temperatures of the, in this case, fourth and fifth reformer tube of a reformer tube row 102 are caused by the fact that the view factor of these reformer tubes with respect to the burner flames is higher than the view factor in the remaining tubes.

The centrally arranged main carrier unit subdivides the reformer furnace into two so-called "bays", wherein each bay has three reformer tube part-rows with in each case four reformer tubes and four burner part-rows with in each case three burners. Such a bay formation is undesired in principle.

Figure 2:
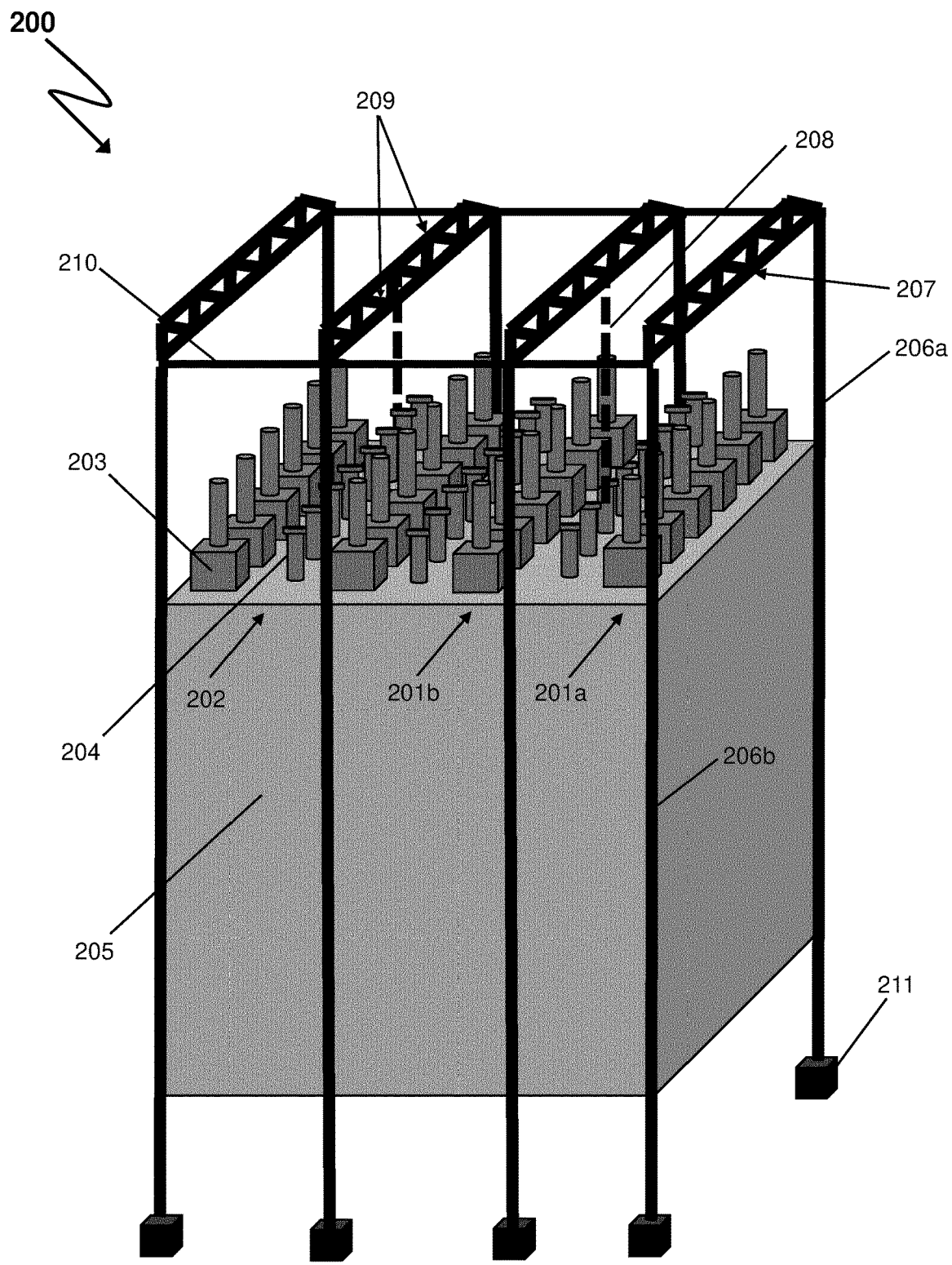
FIG. 2 shows a schematic and highly simplified illustration of a reformer furnace 200 having a steel construction according to the invention.

FIG. 2 shows a schematic and simplified perspective illustration of a reformer furnace 200 having a steel construction according to the invention. Shown substantially is the radiation space of the reformer furnace 200 which has the actual steel construction, a refractory lining and a plurality of reformer tube rows and burner rows. The steel construction serves for the fastening of the burners, reformer tubes and supply and discharge lines leading to/from the burners/reformer tubes. Details regarding the fastening means are not shown for reasons of clarity.

The reformer furnace 200 shown has, analogously to the reformer furnace of FIG. 1, four burner rows 201a, 201b and three reformer tube rows 202. Each of the burner rows 201a, 201b has six burners 203 arranged in a row. Each of the reformer tube rows 202 has eight reformer tubes 204 arranged in a row. The burner rows arranged at the respective left and right edge of the figure are the wall-adjacent burner rows 201a which fire only one reformer tube row 202 arranged adjacently and in parallel. The burner rows arranged between the wall-adjacent burner rows 201a are the non-wall-adjacent burner rows 201b which in each case fire two reformer tube rows 202 arranged adjacently and in parallel. The reformer tube rows 202 and the burner rows 201a, 201b each extend in the z direction of the illustration. The burners 103 each produce downwardly directed flames, that is to say the flame extends substantially in they direction of the drawing and thereby heats the vertically arranged reformer tubes 204 likewise extending in the y direction. The burners 203 project into the firing space of the radiation space of the reformer furnace 200, which is defined by the refractory lining 205 as a boundary towards the outside. Here, the vertically extending reformer tubes 203 traverse the ceiling and the floor of the refractory lining 205 in such a way that the main length of a reformer tube 204 can be heated by means of the adjacently arranged burners. The supply lines for supplying the burners with combustion gas and oxidizer and the reformer tubes with reactant gas are not shown for reasons of clarity. The same applies to the flue gas channels and discharge lines for drawing off the burner exhaust gases, and the discharge lines for discharging the product gases.

The steel construction of the reformer furnace shown has a total of four main carrier units. Each of the four main carrier units has two vertical supports 206a and 206b and also a horizontal main carrier 207. The supports 206a, 206b each have a base 211. The horizontally extending main carriers 207 connect the two vertically extending supports by means of a force-fitting or integrally bonded connection, for example by means of a bolted connection or a welded connection. Here, two of the main carrier units are arranged wall-adjacently on the lateral surfaces (in each case defined by the yz plane) of the reformer furnace, and two of the main carrier units are arranged between the aforementioned main carrier units. Here, all the vertical supports 206a, 206b of the main carrier units are arranged wall-adjacently. The supports 206a, 206b of the two main carrier units arranged between the main carrier units arranged on the lateral surfaces extend along the surfaces of the end sides (defined by the xy plane) of the reformer furnace 200. The supports 206a, 206b of the main carrier units arranged wall-adjacently on the lateral surfaces extend in the region of the boundary between the walls of the end sides (xy plane) and the walls of the lateral surfaces (yz plane) of the reformer furnace 200. The walls of the reformer furnace enclose the radiation space along with the steel construction, the refractory lining 205 and also the burners 203 and reformer tubes 204. The walls of the reformer furnace 200 are not shown for reasons of clarity.

Between the supports 206a, 206b of the main carrier units there are arranged additional vertically extending auxiliary supports 208 which are connected to the main carriers. The auxiliary supports 208 serve for the additional stabilization of the steel construction. The auxiliary supports 208 traverse the ceiling of the refractory lining 205 and are thus arranged partially within the firing space of the reformer furnace 200. In the example of the reformer furnace 200, one auxiliary support 208 is provided for each non-wall-adjacent main carrier 207. Here, the number of the auxiliary supports 208 depends in principle on the length of the reformer furnace, that is to say on the number of the reformer tubes 204 and burners 203 for each reformer tube row or burner row. Above the main carriers 207 the steel construction has, for additional static stabilization, a truss construction 209 which is connected to the main carrier 207 in a force-fitting manner and which has diagonally and vertically arranged interconnected struts. The supports of the main carrier units are connected to one another by horizontally extending crossmembers 210. The crossmembers serve for stabilizing the reformer furnace, but do not bear the main load of the burners 203 and reformer tubes 204 and additionally present supply and discharge lines.

The horizontally extending main carriers 207 of the main carrier units are arranged, according to the invention, parallel to the burner rows 201a, 201b and the reformer tube rows 202. In other words, the main carriers 207 extend in the z direction of the illustration, which also pertains to the burner rows 201a, 201b and reformer tube rows 202, which likewise extend in the z direction. By virtue of the arrangement according to the invention of the main carrier units, in particular on account of the main carriers 207 arranged parallel to the burner rows and reformer tube rows, the burners 203 and reformer tubes 204 can be arranged uniformly spaced apart for each row. Here, the number of the required main carrier units increases with the number of the reformer tube rows and burner rows. In the present case, one main carrier unit is required for each burner row, and one main carrier unit more than reformer tube rows is present. Here, there is in principle no upper cap on the number of the reformer tubes and burners for each row, since between the supports 206a and 207a there can be arranged any desired number of auxiliary supports 208 which extend between the reformer tube rows 202 and burner rows 201a, 201b and which thereby do not interfere with the row symmetry. The steel construction according to the invention allows a reformer furnace to be built that, given the uniform spacing of the reformer tubes, requires no "bays".

Figure 3A:
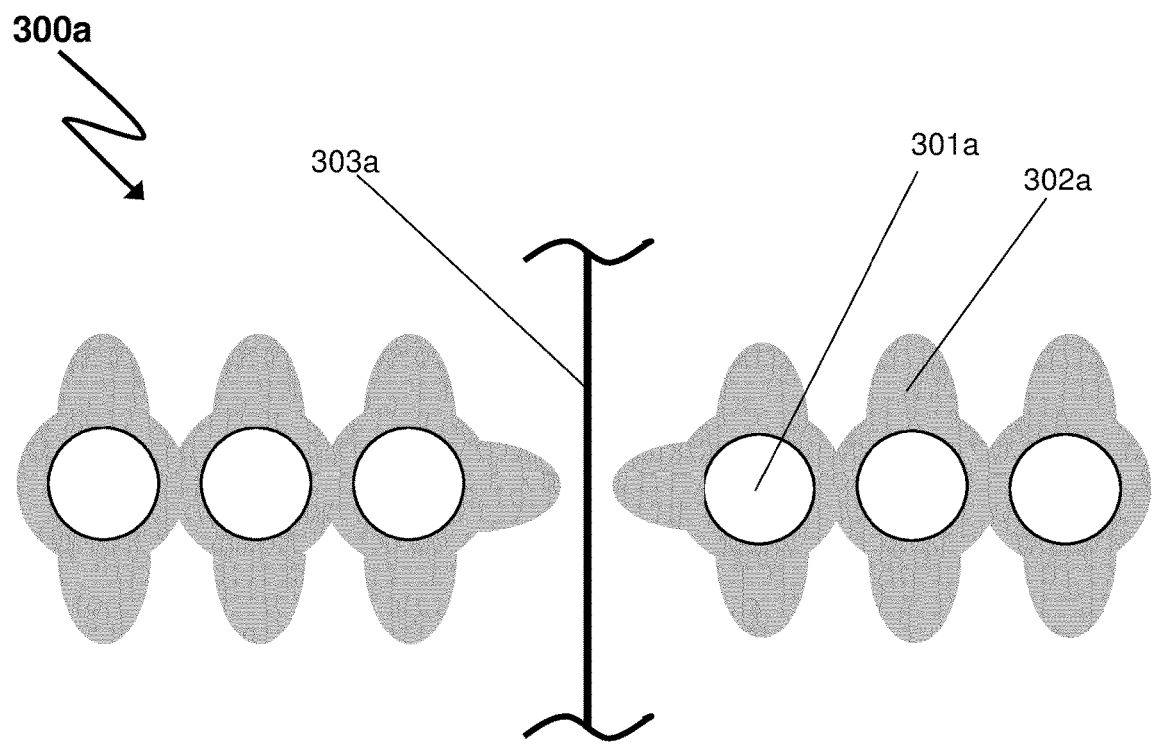
FIG. 3a shows a schematic illustration of the heat flow profile of a reformer tube row 300a according to the prior art with the formation of bays.
Figure 3B:
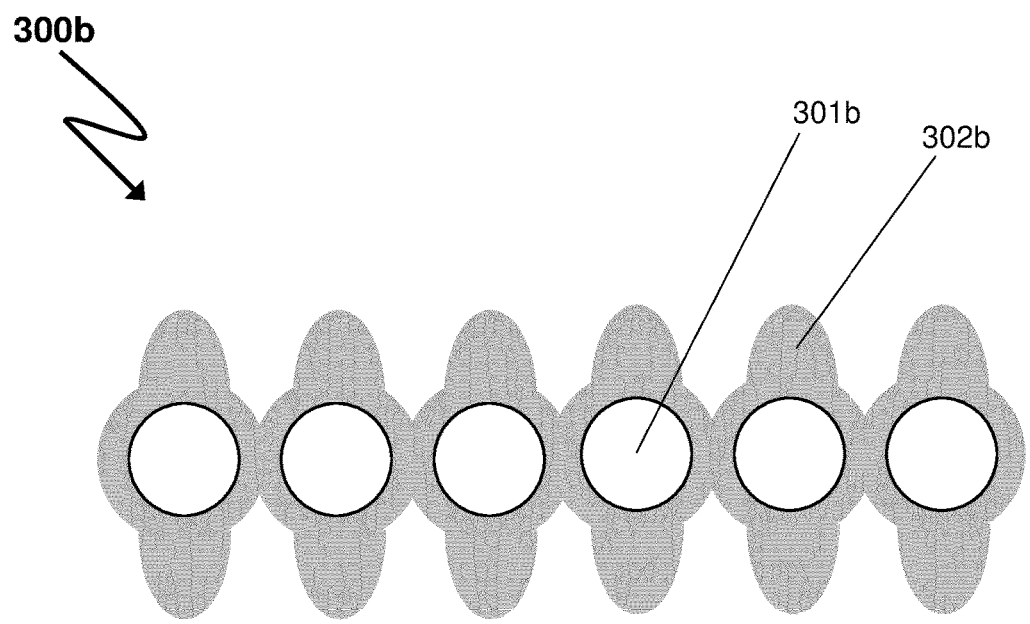
FIG. 3b shows a schematic illustration of the heat flow profile of a reformer tube row 300b according to the reformer furnace according to the invention, without bays.

The uniform spacing of the reformer tubes 202 for each reformer tube row allows the maximum temperature for each tube to be reduced, which is schematically explained by the illustration of FIGS. 3a and 3b.

FIG. 3a shows a detail of a reformer tube row of the reformer furnace 100 with six reformer tubes 301a and associated heat profile 302a. Here, the main carrier 303a of a main carrier unit extends orthogonally to the reformer tube row and thus requires, as explained above, a larger spacing between those reformer tubes 301a which extend in the region of the main carrier 303a. What thus results in this region is an unfavourable heat profile in relation to the remaining region of the reformer tube row. This is caused in particular by the higher view factor of the reformer tubes arranged in the region of the main carrier 303a with respect to the adjacent burner flames.

FIG. 3b shows the analogous case for a reformer furnace 200 according to the invention with reformer tubes 301b and associated heat profile 302b. The uniform spacing of the reformer tubes 301b also causes the heat profile 302b to be evened out, with the result that the maximum operating temperature of a reformer tube 301b can be reduced. The reformer furnace 200 according to the invention advantageously does not have any "bays".

LIST OF REFERENCE SIGNS

100 Reformer furnace (prior art)
200 Reformer furnace (invention)
101a, 201a Burner row (wall-adjacent)
101b, 201b Burner row (non-wall-adjacent)
102, 202 Reformer tube row
103, 203 Burner
104, 204 Reformer tube
105, 205 Refractory lining
106a, 106b, Support
  206a, 206b
107, 207 Main carrier
108, 208 Auxiliary support
109, 209 Truss construction
210 Crossmember
111, 211 Base
301a, 301b Reformer tube
302a, 302b Heat profile
303a Main carrier It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A reformer furnace for catalytic reforming of a carbon-containing input material with steam, comprising:
  a radiation space comprising a plurality of walls and delimited from the external surroundings, wherein
  the radiation space comprises a steel construction configured as a framework and configured to fasten supply and discharge pipelines, burners and vertically arranged reformer tubes, wherein
  the burners are configured to produce downwardly or upwardly directed flames for heating the reformer tubes, and wherein
  the burners and reformer tubes are arranged within the radiation space in rows as burner rows and reformer tube rows, wherein the burner rows and reformer tube rows are arranged in alternating fashion and parallel to one another, and the steel construction comprises a plurality of main carrier units, wherein each main carrier unit has two wall-adjacently arranged, vertically extending supports and a horizontally extending main carrier which is connected via the supports and which extends over the entire length of the radiation space, and wherein the main carriers are configured to fasten the supply and discharge pipelines, burners and reformer tubes, and the steel construction has a plurality of horizontally extending crossmembers which connect the supports of the main carrier units to one another, wherein, the main carriers of the main carrier units are arranged so as to extend parallel to the reformer tube rows and burner rows, and the crossmembers are arranged so as to extend at least partially orthogonally to the reformer tube rows and burner rows.

2. The reformer furnace according to claim 1, wherein the number of the main carrier units is a function of the number of the reformer tube rows and/or a function of the number of the burner rows.

3. The reformer furnace according to claim 1 wherein the radiation space has a number h of main carrier units, and has a number r of reformer tube rows, wherein the relationship between h and r is h=r+1.

4. The reformer furnace according to claim 1, wherein the radiation space has a number h of main carrier units, and has a number b of burner rows, wherein the relationship between h and b is h=b.

5. The reformer furnace according to claim 1, wherein the number of the main carrier units is not a function of the length of a reformer tube row and/or the number of the main carrier units is not a function of the length of a burner row.

6. The reformer furnace according to claim 1, wherein between two adjacent main carrier units an individual burner row is arranged, or one burner row and one reformer tube row adjacent to the burner row are arranged.

7. The reformer furnace according to claim 6, wherein the one individual burner row is a wall-adjacent burner row.

8. The reformer furnace according to claim 1, wherein two of the plurality of main carrier units are arranged on two opposite walls of the radiation space, in each case wall-adjacently, wherein the main carriers of the wall-adjacently positioned main carrier units extend parallel to the respective wall.

9. The reformer furnace according to claim 8, wherein the wall-adjacently arranged main carrier units have more than two wall-adjacently arranged, vertically extending supports.

10. The reformer furnace according to claim 1, wherein all the spacings between two adjacent reformer tubes within a reformer tube row and/or all the spacings between two adjacent burners within a burner row are identical within the entire radiation space of the reformer furnace.

11. The reformer furnace according to claim 1, wherein all the spacings between two adjacent reformer tubes, measured through the horizontal extending between two reformer tube axes of adjacent reformer tubes, are less than or equal to 500 mm.

12. The reformer furnace according to claim 1, wherein the temperature of the product gas withdrawn via the discharge pipelines is on average up to 950° C.

13. The reformer furnace according to claim 1, wherein the steel construction serves as a framework for a refractory lining of the radiation space, wherein the space within the refractory lining defines a firing space for firing the reformer tubes.

14. The reformer furnace according to claim 1, wherein each main carrier unit has a truss construction arranged above the main carrier unit and connected to the main carrier in a force-fitting manner.

* * * * *